US011819182B2

(12) United States Patent
Kim (10) Patent No.: US 11,819,182 B2
(45) Date of Patent: Nov. 21, 2023

(54) DUST REMOVER FOR VACUUM CLEANER

(71) Applicant: Hyun Tae Kim, Paju-si (KR)

(72) Inventor: Hyun Tae Kim, Paju-si (KR)

( * ) Notice: Subject to any disclaimer, the term of this patent is extended or adjusted under 35 U.S.C. 154(b) by 0 days.

(21) Appl. No.: 17/825,592

(22) Filed: May 26, 2022

(65) Prior Publication Data

US 2022/0400921 A1 Dec. 22, 2022

(30) Foreign Application Priority Data

Jun. 18, 2021 (KR) .......................... 10-2021-0079516

(51) Int. Cl.
*A47L 9/20* (2006.01)
*A47L 9/12* (2006.01)

(52) U.S. Cl.
CPC .................. *A47L 9/20* (2013.01); *A47L 9/127* (2013.01)

(58) Field of Classification Search
CPC .................................... A47L 9/20; A47L 9/127
See application file for complete search history.

(56) References Cited

U.S. PATENT DOCUMENTS 5,335,740 A * 8/1994 Meyer .................... A47L 5/28
180/19.1
8,516,654 B1 * 8/2013 McCutchen .............. A47L 9/20
15/352
2017/0251894 A1 * 9/2017 Kim ......................... A47L 5/28
2018/0055329 A1 * 3/2018 Lehmann ............ A47L 15/4259

FOREIGN PATENT DOCUMENTS

| JP | 2014124550 A | 7/2014 |
| KR | 10-2013-0063655 A | 6/2013 |
| KR | 10-2013-0115529 A | 10/2013 |
| KR | 10-2014-0136814 A | 12/2014 |
| KR | 101661314 B1 | 9/2016 |

* cited by examiner

*Primary Examiner* — Andrew A Horton
(74) *Attorney, Agent, or Firm* — Harness, Dickey & Pierce, P.L.C.

(57) ABSTRACT

A dust remover for a vacuum cleaner, in which dust adhering to a plurality of filters having a cylindrical shape for filtering dust introduced into the vacuum cleaner is removed by repeatedly hitting an inner wall of each of the plurality of filters through rotation of a motor, includes a filter support plate having a plate shape; a plurality of filters arranged spaced apart from each other at regular intervals below the filter support plate in a circumferential direction; a hitting module rotatably provided on the filter support plate to extend to an inner space of each of the filters and configured to hit an inner surface of each of the filters; and a pressure control damper rotatably provided on the filter support plate and configured to optionally open/close a suction pressure of each of the filters.

8 Claims, 7 Drawing Sheets

DUST REMOVER FOR VACUUM CLEANER

CROSS-REFERENCE TO RELATED APPLICATION

This application claims the benefit of Korean Patent Application No. 10-2021-0079516, filed on Jun. 18, 2021, in the Korean Intellectual Property Office, the disclosure of which is incorporated herein in its entirety by reference.

BACKGROUND

1. Field

The disclosure relates to a vacuum cleaner, and more particularly, to a device that automatically removes dust off from a filter installed in an industrial vacuum cleaner.

2. Description of the Related Art

In general, a drum-type vacuum cleaner includes a head portion having a blower fan to suck air and a drum main body for sucking and filtering foreign materials, such as dust and the like. A cylindrical filter is installed in the drum main body to filter foreign materials, such as dust, that are sucked through an inlet that an operator holds by the hands for work. The foreign materials filtered by the filter are accommodated in a dust collection box installed below the filter. However, as a cleaning work is carried out on a surface of the filter, fine dust continuously adheres thereto. Accordingly, the function of the filter is degraded. In the related art, fine dust adhering to the surface of a filter is removed by manually applying an impact to the filter.

In this regard, vacuum cleaners with improved work convenience by automating the function of removing fine dust adhering to the filter have been developed and used. As such, Korean Patent Publication No. 2013-0115529 discloses an example of a vacuum cleaner having a filter dust-removing function. The publication discloses that, to implement the dust-removing function of a filter, the vacuum cleaner has a structure in which a motor is installed inside a cylindrical filter and a hitting stick is installed on a rotation shaft of the motor, so that the hitting stick, while rotating, applies an impact to the filter to remove dust adhering to the filter.

However, the filter-hitting type dust remover according to the related art has a problem in that, as a strong sucking force acts from the outside to the inside of a filter during the operation of the vacuum cleaner, dust adhering to an outer surface of the filter is not separated from the filter by hitting. Accordingly, cleaning efficiency is remarkably degraded because the operation of a vacuum cleaner has to be stopped to remove dust adhering to a filter.

SUMMARY

Provided is a vacuum cleaner having improved cleaning efficiency by improving a structure of a dust remover to effectively remove dust adhering to a surface of the vacuum cleaner.

Additional aspects will be set forth in part in the description which follows and, in part, will be apparent from the description, or may be learned by practice of the presented embodiments.

According to an aspect of the disclosure, a dust remover for a vacuum cleaner, in which dust adhering to a plurality of filters having a cylindrical shape for filtering dust introduced into the vacuum cleaner is removed by repeatedly hitting an inner wall of each of the plurality of filters through rotation of a motor, includes a filter support plate having a plate shape, a plurality of filters arranged spaced apart from each other at regular intervals below the filter support plate in a circumferential direction, a hitting module rotatably provided on the filter support plate to extend to an inner space of each of the plurality of filters and configured to hit an inner surface of each of the plurality of filters, a pressure control damper rotatably provided on the filter support plate and configured to optionally open/close a suction pressure of each of the plurality of filters, and a damper guide member fixed to an upper portion of the filter support plate and disposed to cover an upper edge part of the pressure control damper and guide a rotation of the pressure control damper.

A fluid path independently communicating with the inner space of each of the plurality of filters may be provided in a lower portion of the filter support plate, and the pressure control damper may be configured to sequentially open/close the fluid path by rotating in an upper end portion of the fluid path.

The pressure control damper may have a shape of a disc being partially cut off.

The hitting module may be dynamically connected to the pressure control damper by a chain, and the hitting module and the pressure control damper may be integrally rotated by a single motor.

The dust remover may further include a first sprocket on a central shaft of the hitting module, and a second sprocket on a central shaft of the pressure control damper, wherein the second sprocket is configured to rotate slower than a rotation speed of the first sprocket.

The dust remover may further include a shaft support structure to structurally connect an upper end of a central shaft of the hitting module to an upper end of the central shaft of the pressure control damper.

The dust remover may further include a tension adjuster on the upper portion of the filter support plate and adjusting a tension of the chain, wherein the tension adjuster includes: a third sprocket rotatably provided on the filter support plate and coupled to the chain, and a coil spring elastically fixing the third sprocket to the filter support plate.

The dust remover may further include a plurality of hitting members arranged spaced apart from each other in the lengthwise direction of a central shaft of the hitting module, wherein the hitting member is elastically rotatable in a direction opposite to a rotation direction of the central shaft of the hitting module, and has elastic resilience in the rotation direction of the central shaft of the hitting module.

The dust remover may further include a pressure interference blocking member provided in a lower portion of the filter support plate and blocking interference of a suction pressure between the plurality of filters.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, an embodiment according to the disclosure is described in detail with reference to the accompanying drawings.

Figure 1:
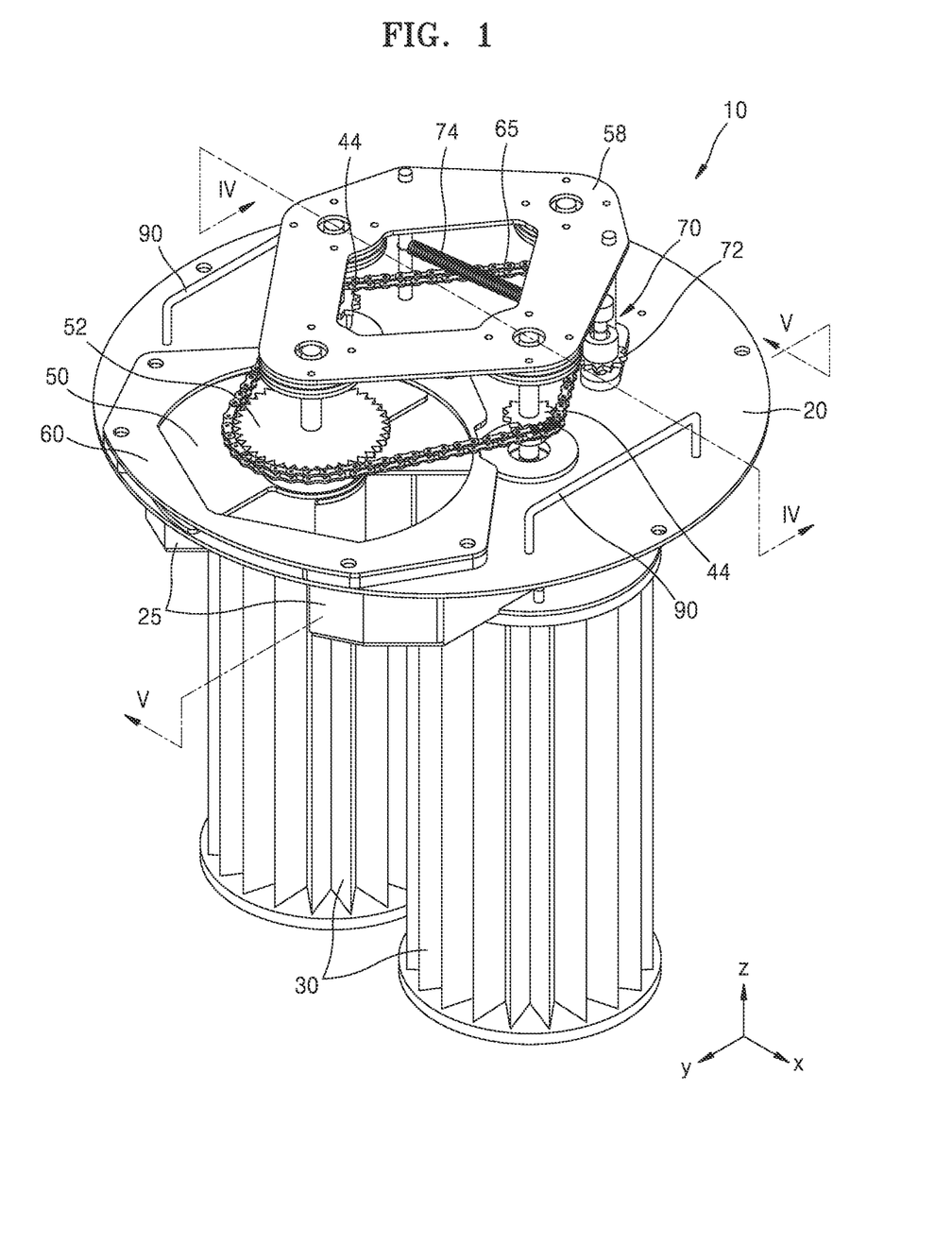
FIG. 1 is a schematic perspective view of a dust remover for a vacuum cleaner, according to the disclosure.
Figure 2:
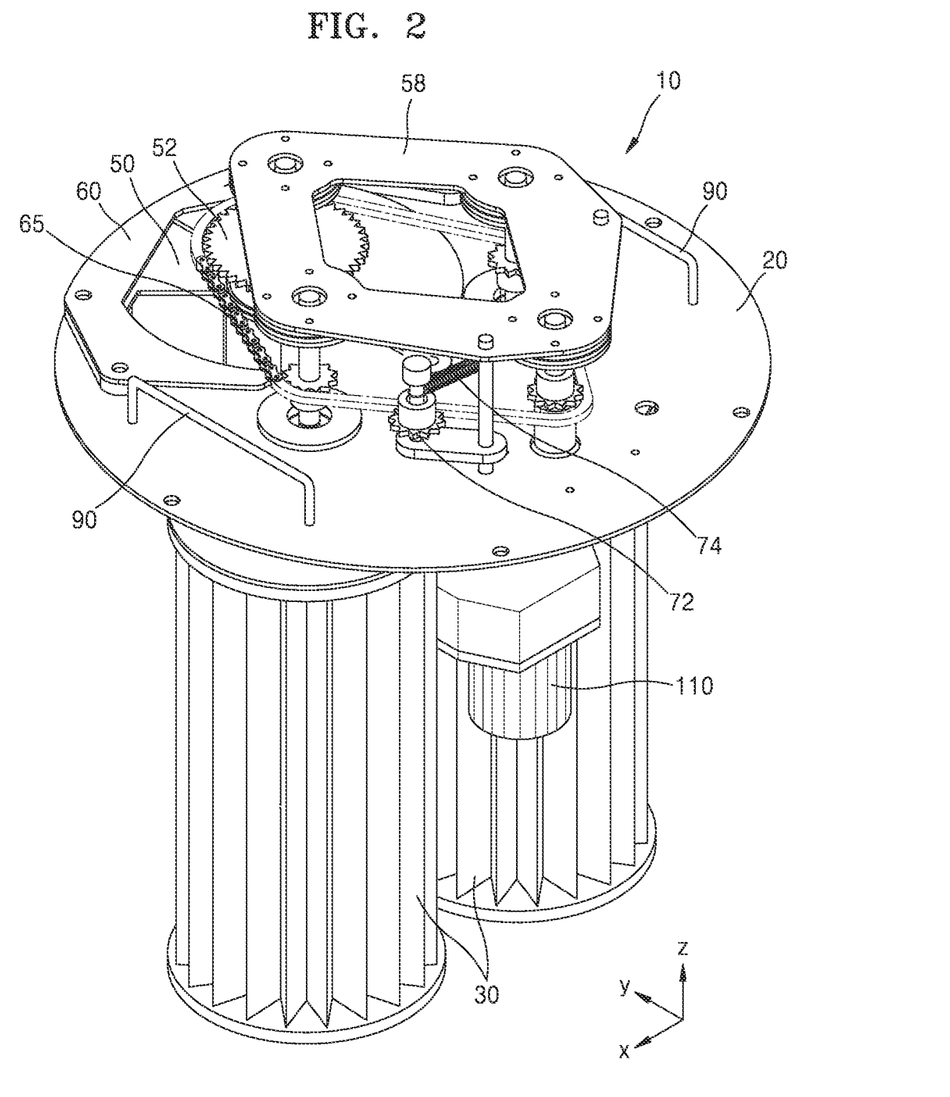
FIG. 2 is a view of the dust remover of FIG. 1 when viewed in a different direction.
Figure 3:
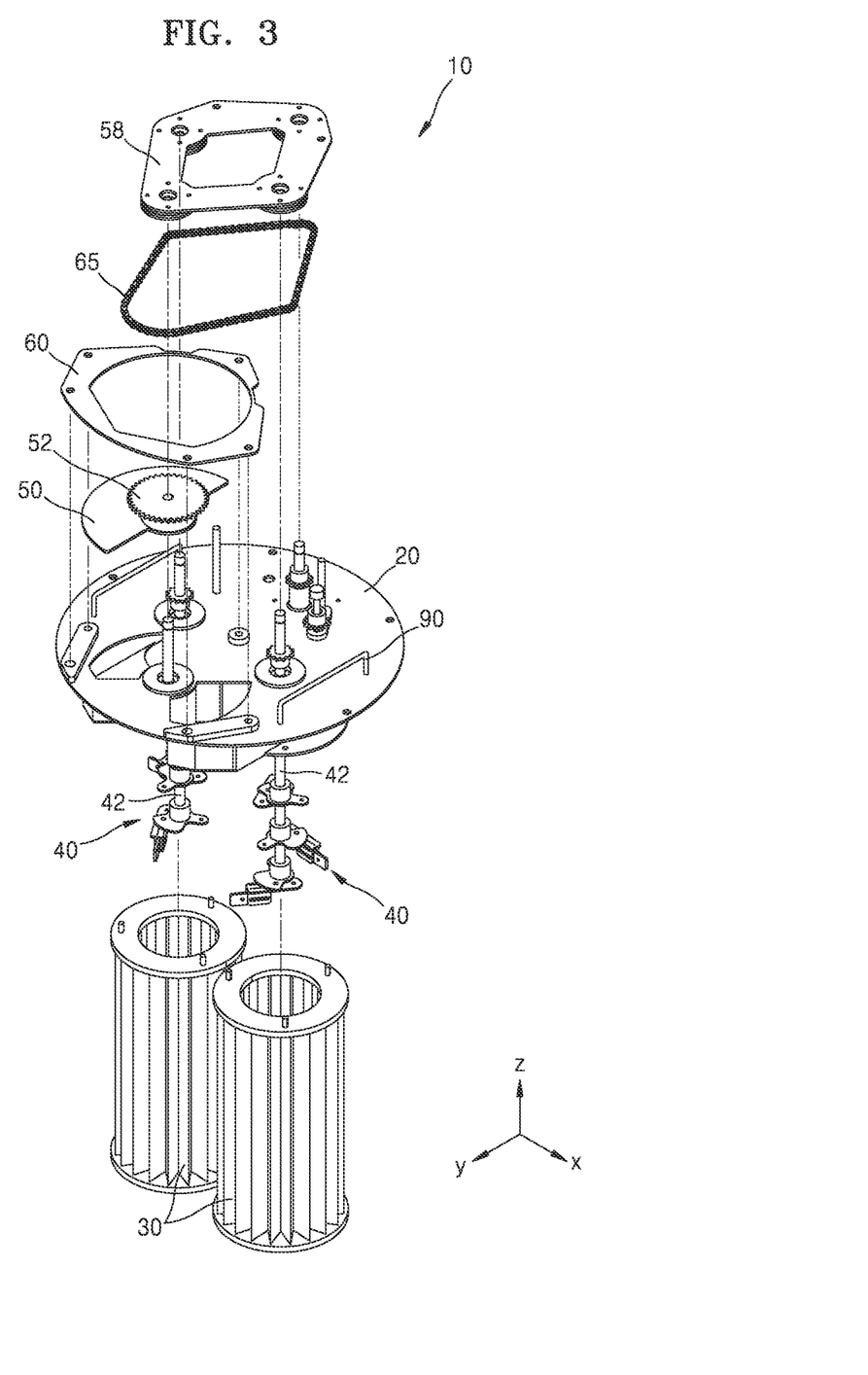
FIG. 3 is an exploded perspective view of the dust remover of FIG. 1.
Figure 4:
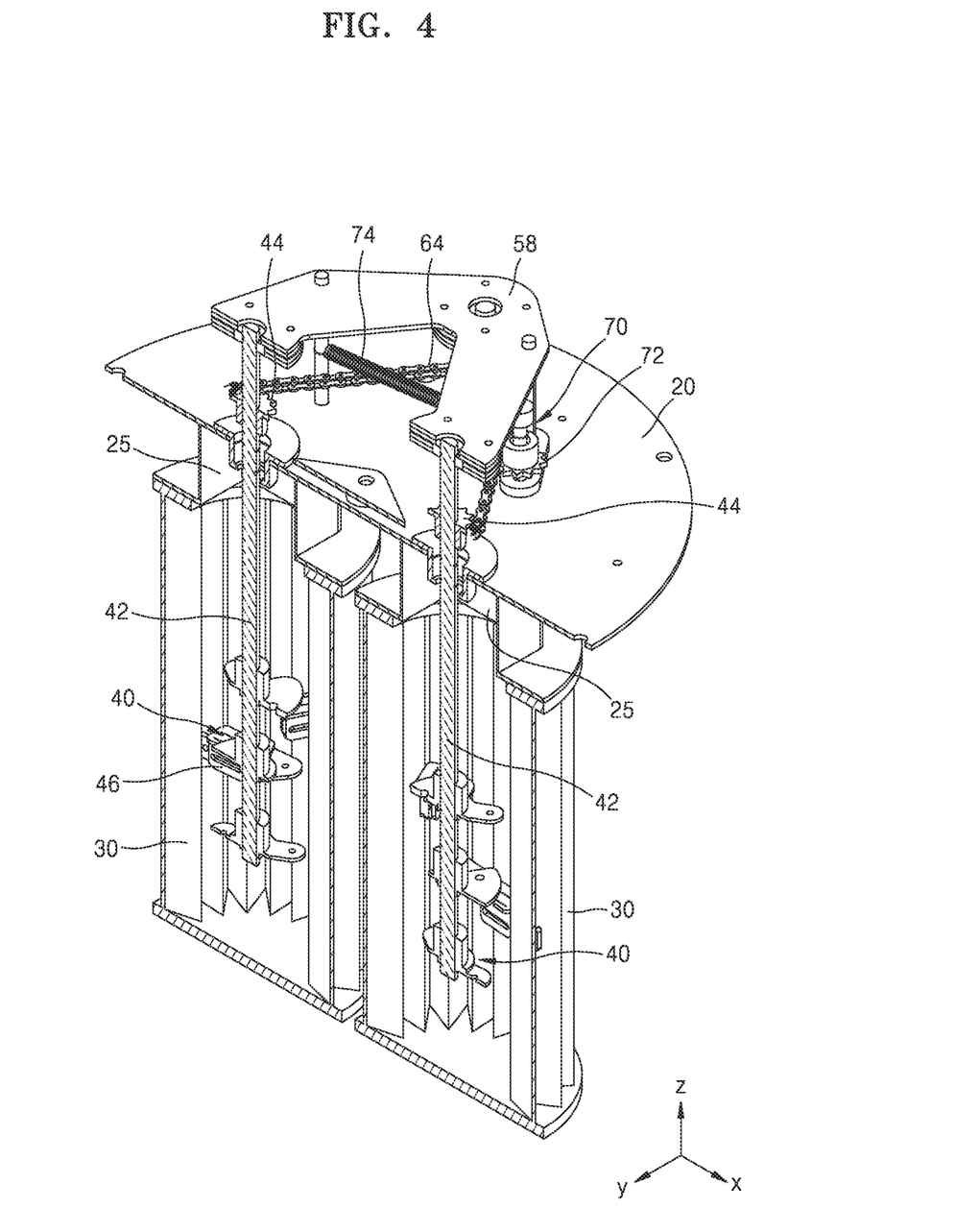
FIG. 4 is a cross-sectional view of the dust remover taken along line IV-IV of FIG. 1.
Figure 5:
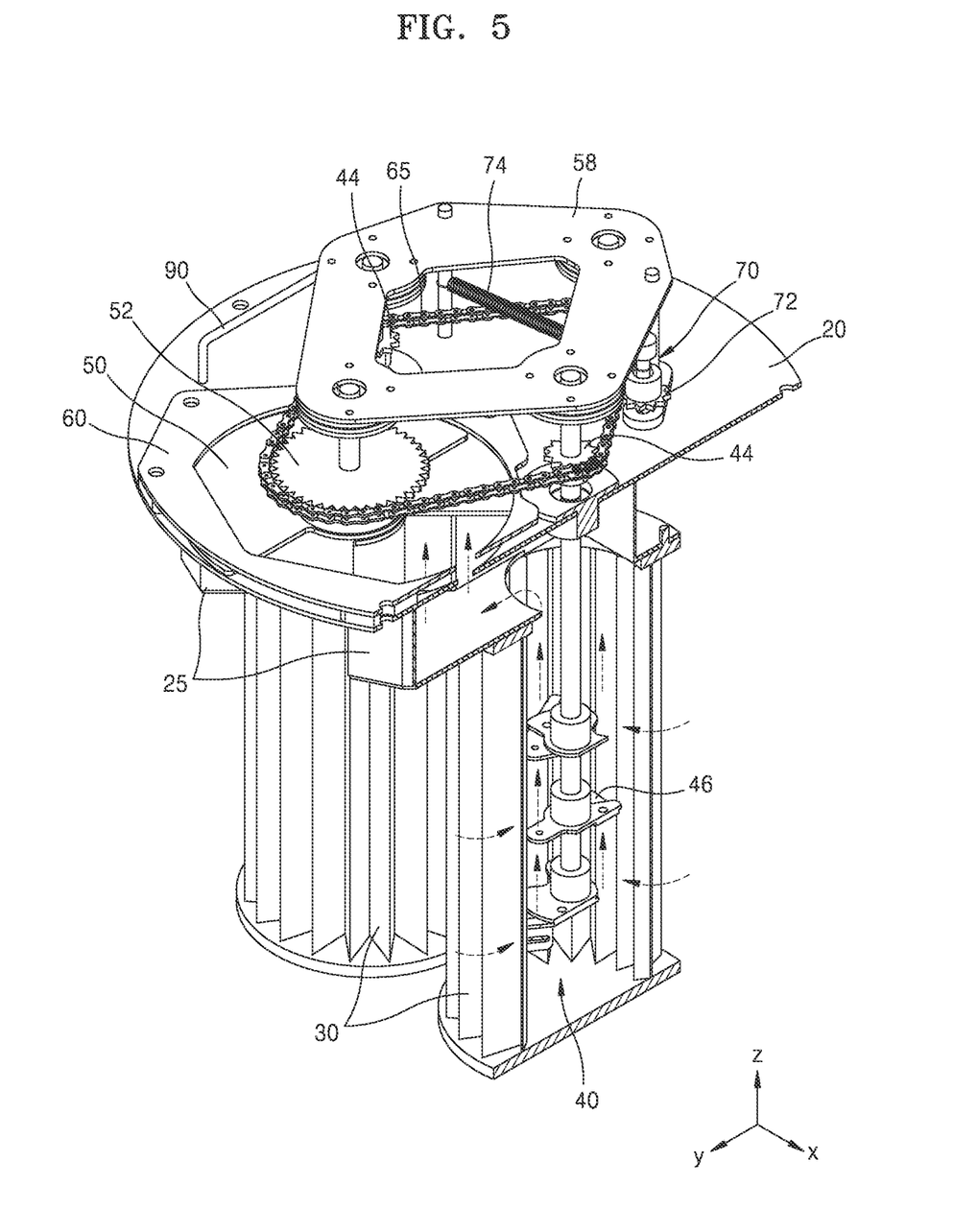
FIG. 5 is a cross-sectional view of the dust remover taken along line V-V of FIG. 1.
Figure 6:
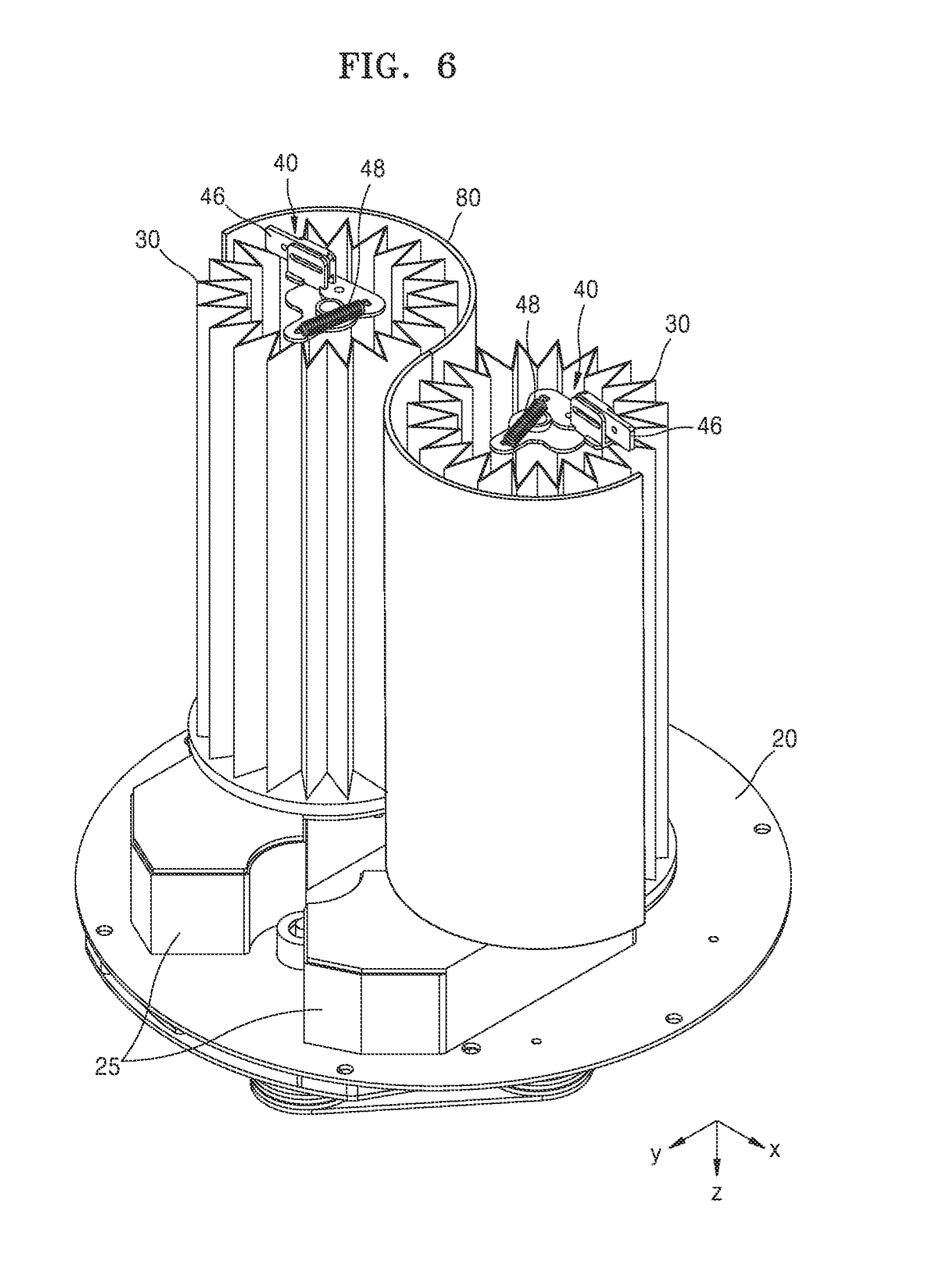
FIG. 6 is a perspective view showing the installation structure of a pressure interference blocking member according to the disclosure.
Figure 7:
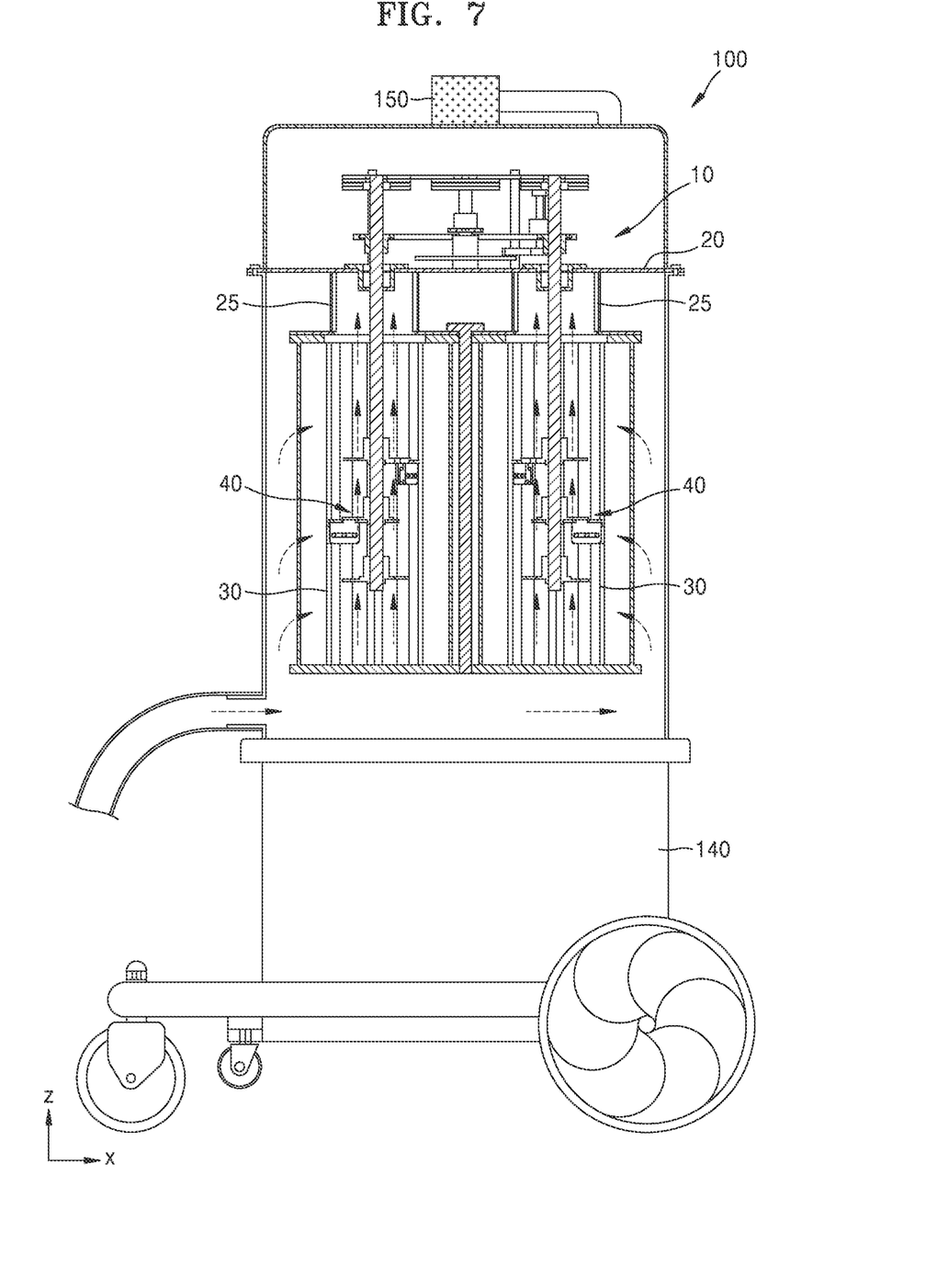
FIG. 7 is a cross-sectional view of a vacuum cleaner adopting the dust remover of FIG. 1.

FIG. 1 is a schematic perspective view of a dust remover for a vacuum cleaner, according to the disclosure. FIG. 2 is a view of the dust remover of FIG. 1 when viewed in a different direction. FIG. 3 is an exploded perspective view of the dust remover of FIG. 1. FIG. 4 is a cross-sectional view of the dust remover taken along line IV-IV of FIG. 1. FIG. 5 is a cross-sectional view of the dust remover taken along line V-V of FIG. 1. FIG. 6 is a perspective view showing the installation structure of a pressure interference blocking member according to the disclosure. FIG. 7 is a cross-sectional view of a vacuum cleaner adopting the dust remover of FIG. 1.

Referring to FIGS. 1 to 7, a dust remover 10 for a vacuum cleaner 100 (hereinafter, referred to as the "dust remover") according to an embodiment of the disclosure includes a plurality of filters 30 having a cylindrical shape for filtering dust introduced into the vacuum cleaner 100. The dust remover 10 basically has a structure that may repeatedly hit inner walls of the filters 30 while being rotated by a motor 110, thereby removing the dust adhering to the filters 30.

The dust remover 10 further includes a filter support plate 20, the filters 30, a hitting module 40, a pressure control damper 50, a fluid path 25, a shaft support structure 58, a tension adjuster 70, a damper guide member 60, and a pressure interference blocking member 80.

The filter support plate 20 has a structure of a plate shape. The filter support plate 20 may have a disc shape. The filter support plate 20 is provided with holes in which a rotation shaft of the motor 110, a central shaft of the hitting module 40, and a central shaft of the pressure control damper 50 may be provided. The filter support plate 20 is provided with a through-hole connected to the fluid path 25 that is described below. An upper side and a lower side of the filter support plate 20 are spatially blocked from each other. Air in an upper space of the filter support plate 20 is discharged to the outside by a blower that is provided outside a frame of the vacuum cleaner 100. The air between the upper side and the lower side of the filter support plate 20 may be moved only through the fluid path 25 that is described below.

The filters 30 essentially include a plurality of filters. In other words, the dust remover 10 according to the disclosure includes at least two filters 30. The filters 30 have a structure of a cylindrical shape, and the lower portion thereof is in a closed state. Side walls of the filters 30 form a corrugation with repeated ridges and grooves in a cross-section. The outside and the inside of the side walls of filters 30 communicate with each other by micropores. The filters 30 may have a density of a HEPA filter level capable of blocking particles of 0.3 μm at a rate of 85% to 99.97%. An outer surface of the side walls of the filters 30 may be coated with polytetrafluoroethylene (PTFE). A typical product name of PTFE is Teflon. Upper portions of the filters 30 are open. The upper portions of the filters 30 are fixed to the filter support plate 20. In detail, the upper portions of the filters 30 are fixed to a lower surface of the fluid path 25. The fluid path 25 is fixed to a lower surface of the filter support plate 20. A reinforcement member of a metal material is coupled to the groove forming a corrugation of the inner surface of the side walls of the filters 30. The reinforcement member is provided to prevent the filters 30 from being easily damaged and to allow the filters 30 to have sufficient durability, in spite of repeated hitting by the hitting module 40. The filters 30 are arranged spaced apart from each other below the filter support plate 20 at regular intervals in a circumferential direction.

The hitting module 40 is rotatably installed on the filter support plate 20. The hitting module 40 is provided to correspond to the number of filters 30. The hitting module 40 is provided to extend into an inner space of each of the filters 30. The hitting module 40 hits the inner surface of each of the filters 30. In detail, the hitting module 40 includes a hitting central shaft 42 and a hitting member 46. The hitting member 46 includes a plurality of hitting members arranged spaced apart from each other in a lengthwise direction of the hitting central shaft 42. The hitting member 46 is capable of elastically rotating within a specific angular range in a direction opposite to a rotation direction of the hitting central shaft 42. The hitting member 46 has elastic resilience, by a restoration spring 48, in the rotation direction of the hitting central shaft 42. A contact portion of the hitting member 46 in contact with the filters 30 may be formed of a synthetic resin material. The hitting module 40 may be rotated by the motor 110 that is a single motor as described above. In another embodiment, the hitting module 40 may be rotated by an independent motor.

The pressure control damper 50 is rotatably provided on the filter support plate 20. The pressure control damper 50 has a structure of a plate shape that optionally opens/closes a suction pressure of each of the filters 30. The pressure control damper 50 may have a shape of a disc that is partially cut off. A central shaft of the pressure control damper 50 is positioned parallel to the hitting central shaft 42. To improve airtightness with the upper surface of the filter support plate 20, a foamed synthetic resin material capable of elastic deformation may be attached to a lower surface of the pressure control damper 50.

The damper guide member 60 may be provided above the pressure control damper 50. The damper guide member 60 is fixed to an upper portion of the filter support plate 20. The damper guide member 60 covers an upper edge part of the pressure control damper 50. The damper guide member 60 guides the rotation of the pressure control damper 50. The damper guide member 60 prevents the pressure control damper 50 from escaping upwards from the filter support plate 20 due to the suction pressure.

The fluid path 25 is a path connecting the inner spaces of the filters 30 to an upper space of the filter support plate 20. The fluid path 25 is formed to independently communicate with the inner space of each of the filters 30. In the present embodiment, as the filters 30 include two filters, two fluid paths are provided as the fluid path 25. Upper end portions of two fluid paths are open/closed by the pressure control damper 50. The fluid path 25 may be fixed to a lower portion of the filter support plate 20. The pressure control damper 50 sequentially opens/closes a plurality of the fluid paths 25 by rotating in the upper end portion of the fluid path 25. The air having passed through the fluid path 25 and the pressure control damper 50 may be discharged to the outside of the vacuum cleaner 100 by a blower fan 150 disposed outside the vacuum cleaner 100.

The hitting module 40 may be dynamically connected to the pressure control damper 50 by a chain. In detail, the central shaft of the hitting module 40 and the central shaft of the pressure control damper 50 are connected to each other by a chain 65. Furthermore, the hitting module 40 and the pressure control damper 50 may be integrally rotated by the motor 110 that is a single motor. In another embodiment, the central shaft of the hitting module 40 and the central shaft of the pressure control damper 50 may be integrally rotated by the motor 110 that is a single motor, by a combination of a belt and other gear sets, in addition to the chain 65. In another embodiment, the pressure control damper 50 may be rotated by an independent motor.

A first sprocket 44 is formed on the central shaft of the hitting module 40. The first sprocket 44 may be coupled to the central shaft of the hitting module 40.

A second sprocket 52 is formed on the central shaft of the pressure control damper 50. The second sprocket 52 may be coupled to the central shaft of the pressure control damper 50.

The second sprocket 52 may rotate slower than a rotation speed of the first sprocket 44. For example, the number of teeth of the second sprocket 52 is greater than the number of teeth of the first sprocket 44.

The shaft support structure 58 structurally connects an upper end of the central shaft of the hitting module 40 and an upper end of the central shaft of the pressure control damper 50, which are coupled to the filter support plate 20 of a plate shape. The shaft support structure 58 may be rotatably coupled, by means of bearings, to the central shaft of the hitting module 40, the central shaft of the pressure control damper 50, and the rotation shaft of the motor 110. The shaft support structure 58 is a reinforcement structure provided to prevent the central shaft of the hitting module 40, the central shaft of the pressure control damper 50, and the rotation shaft of the motor 110 from losing parallelism due to the tension of the chain 65.

The tension adjuster 70 is provided on the upper portion of the filter support plate 20. The tension adjuster 70 is a device to adjust the tension of the chain 65. The tension adjuster 70 includes a third sprocket 72 and a coil spring 74.

The third sprocket 72 has a toothed wheel structure provided capable of rotating about a column fixed to the filter support plate 20. The third sprocket 72 is a member to maintain tight tension by pressing the chain 65 that has been loosely assembled in an assembly process of the chain 65.

The coil spring 74 has an elastic structure of elastically fixing the third sprocket 72 to the filter support plate 20. The coil spring 74 may be fixedly hung on a structure of a column shape fixed to the filter support plate 20. The coil spring 74 may employ a tension coil spring.

The pressure interference blocking member 80 is provided in the lower portion of the filter support plate 20. The pressure interference blocking member 80 blocks interference of a suction pressure between the filters 30 that are provided in the lower portion of the filter support plate 20. The pressure interference blocking member 80 may be fixed to a lower end portion of the fluid path 25 by using a means, such as a bolt. The pressure interference blocking member 80 is provided such that an interval from each of the filters 30 gradually increases in a direction in which air flows along the outside of the side walls of the filters 30. The pressure interference blocking member 80 is provided only in a limited region along a circumferential surface of a side wall of each of the filters 30. When an installation area of the pressure interference blocking member 80 increases too much, the performance of the filters 30 may degrade.

A pair of handles 90 may be provided on the upper surface of the filter support plate 20. The handles 90 are provided to facilitate placing of an operator's hand or equipment, such as a hoist, in a process of assembling the dust remover 10 to or disassembling the dust remover 10 from the vacuum cleaner 100 for replacement or repair.

In the following description, the operation and effects of the dust remover 10 for the vacuum cleaner 100 including constituent elements described above are described in detail.

The operation and effects of the disclosure are described in detail with an example of cleaning by operating a vacuum cleaner employing the dust remover 10 according to disclosure, as illustrated in FIG. 7.

First, dust or foreign materials accumulated on the floor are sucked into the vacuum cleaner 100 by operating the vacuum cleaner 100. The dust and foreign materials sucked into the inside of the vacuum cleaner 100 collide with the outer walls of the filters 30. Heavy particles or large particles fall downwards from the filters 30 and are accommodated in a dust collection tank 140. Light particles or small particle are accumulated by adhering to the outer walls of the filters 30. As dust particles are stacked on the outer walls of the filters 30, sucking of the vacuum cleaner 100 is weakened, and thus, an overload is generated in a blowing motor (not shown) for rotating the blower fan 150. To prevent the generation of an overload, the dust remover 10 is operated intermittently or continuously. The motor 110 is operated to operate the dust remover 10. As the motor 110 is operated, the central shafts of the hitting module 40 and the pressure control damper 50 connected by the chain 65 are rotated. As the hitting module 40 is rotated, the hitting member 46 hits the inner wall of each of the filters 30. In this process, as the pressure control damper 50 rotates, the upper portions of some of the filters 30 are open or closed. For the filters 30 with the upper portions being opened by the pressure control damper 50, as a strong suction pressure is applied from the outer walls to the inner walls of the filters 30, even when the hitting member 46 hits the inner walls of the filters 30, a dust removing effect does not work properly. For the filters 30 with the upper portions being closed by the pressure control damper 50, as the suction pressure from the inner walls to the output walls of the filters 30 is removed, when the hitting member 46 hits the inner walls of the filters 30, the dust removing effect works properly. Accordingly, a dust removing function of the filters 30 with the upper portions being closed by the pressure control damper 50 is remarkably improved. As such, the pressure control damper 50 sequentially or optionally opens or closes the upper portions of the filters 30, and a high suction pressure is always applied to some of the filters 30. Accordingly, even in a state in which the operation of the vacuum cleaner 100 is not stopped, the dust removing functions of the filters 30 are sequentially performed. Accordingly, even when the vacuum cleaner 100 is continuously used for a long time, the blocking of the filters 30 is remarkably reduced, and thus, cleaning efficiency is greatly improved.

As such, as the dust remover for a vacuum cleaner according to the disclosure is configured to control suction pressures of the insides of the respective filters by sequentially opening/closing the fluid paths by using a pressure control damper, in a process of hitting, by each hitting module, the inside of a plurality of filters of a cylindrical shape, the dust adhering to an outer surface of a filter that is closed by an internal suction pressure does not interfere with the suction pressure, thereby enabling effective dust removal. Furthermore, in the dust remover for a vacuum cleaner according to the disclosure, as internal suction pressures of a plurality of filters of a cylindrical shape are controlled by sequentially opening/closing the fluid paths, even without stopping the operation of a vacuum cleaner, an effective dust-removing function may be performed.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A dust remover for a vacuum cleaner, in which dust adhering to a plurality of filters having a cylindrical shape for filtering dust introduced into the vacuum cleaner is removed by repeatedly hitting an inner wall of each of the plurality of filters through rotation of a motor, the dust remover comprising:
    a filter support plate having a plate shape;
    the plurality of filters arranged spaced apart from each other at regular intervals below the filter support plate in a circumferential direction;
    a hitting module rotatably provided on the filter support plate to extend to an inner space of each of the plurality of filters and configured to hit an inner surface of each of the plurality of filters;
    a pressure control damper rotatably provided on the filter support plate and configured to optionally open/close a suction pressure of each of the plurality of filters;
    a damper guide member fixed to an upper portion of the filter support plate and disposed to cover an upper edge part of the pressure control damper and guide a rotation of the pressure control damper; and
    a pressure interference blocking member provided in a lower portion of the filter support plate and blocking interference of a suction pressure between the plurality of filters;
    wherein the pressure interference blocking member is provided such that an interval from each of the filters gradually increases in a direction in which air flows along the outside of the side walls of the filters.

2. The dust remover of claim 1, wherein a fluid path independently communicating with the inner space of each of the plurality of filters is provided in a lower portion of the filter support plate, and
    the pressure control damper is configured to sequentially open/close the fluid path by rotating in an upper end portion of the fluid path.

3. The dust remover of claim 2, wherein the pressure control damper has a shape of a disc that is partially cut off.

4. The dust remover of claim 1, wherein the hitting module is dynamically connected to the pressure control damper by a chain, and
    the hitting module and the pressure control damper are integrally rotated by a single motor.

5. The dust remover of claim 4, further comprising:
    a first sprocket on a central shaft of the hitting module; and
    a second sprocket on a central shaft of the pressure control damper,
    wherein the second sprocket is configured to rotate slower than a rotation speed of the first sprocket.

6. The dust remover of claim 5, further comprising a tension adjuster on the upper portion of the filter support plate and adjusting a tension of the chain,
    wherein the tension adjuster comprises: a third sprocket rotatably provided on the filter support plate and coupled to the chain; and a coil spring elastically fixing the third sprocket to the filter support plate.

7. The dust remover of claim 1, further comprising a shaft support structure to structurally connect an upper end of a central shaft of the hitting module to an upper end of a central shaft of the pressure control damper.

8. The dust remover of claim 1, further comprising a plurality of hitting members arranged spaced apart from each other in a lengthwise direction of a central shaft of the hitting module,
    wherein the hitting member is elastically rotatable in a direction opposite to a rotation direction of the central shaft of the hitting module, and has elastic resilience in the rotation direction of the central shaft of the hitting module.

* * * * *